United States Patent [19]
Herbst et al.

[11] Patent Number: 5,985,964
[45] Date of Patent: Nov. 16, 1999

[54] STABILIZED POLYVINYL CHLORIDE CONTAINING RECYCLED MATERIAL

[75] Inventors: Heinz Herbst, Lautertal; Kurt Hoffmann, Wachenheim; Rudolf Pfaendner, Rimbach; Rolf Drewes, Bad Bellingen, all of Germany

[73] Assignee: Witco Vinyl Additives GmbH, Lampertheim, Germany

[21] Appl. No.: 08/973,648

[22] PCT Filed: Jun. 7, 1996

[86] PCT No.: PCT/EP96/02491

§ 371 Date: Dec. 18, 1997

§ 102(e) Date: Dec. 18, 1997

[87] PCT Pub. No.: WO97/00905

PCT Pub. Date: Jan. 9, 1997

[30] Foreign Application Priority Data

Jun. 20, 1995 [CH] Switzerland ............................ 1808/95

[51] Int. Cl.[6] .................................. C08J 5/10; C08K 5/15
[52] U.S. Cl. ............... 524/114; 252/400.52; 252/400.61; 524/399
[58] Field of Search ..................... 524/230, 385, 524/450, 445, 447, 448, 449, 126, 128, 99, 236, 398, 399, 400, 114; 252/400.52, 400.61

[56] References Cited

U.S. PATENT DOCUMENTS

| | | | |
|---|---|---|---|
| 5,492,949 | 2/1996 | Drewes et al. | 524/114 |
| 5,726,234 | 3/1998 | Herbst et al. | 524/430 |

FOREIGN PATENT DOCUMENTS

WO/9429377  12/1994  WIPO .

OTHER PUBLICATIONS

Chem. Abst. 124:15536g, 1995.
Chem. Abst. 124:147758r, 1995.
Chem. Abst. 120:219215d, 1993.
Chem. Abst. 120:219214c, 1993.
Chem. Abst. 124:3133w, 1995.

*Primary Examiner*—James J. Seidleck
*Assistant Examiner*—U. K Rajguru
*Attorney, Agent, or Firm*—Scully, Scott, Murphy & Presser

[57] ABSTRACT

High stabilization of PVC containing recycled material is achieved by using at least one lubricant and a stabilizer containing no lead or cadmium compounds.

2 Claims, No Drawings

STABILIZED POLYVINYL CHLORIDE CONTAINING RECYCLED MATERIAL

The invention relates to stabilized polyvinyl chloride (PVC) containing recycled material, to stabilizer mixtures, to a process for the preparation of stabilized PVC containing recycled material, and to the use of stabilized PVC containing recycled material.

PVC, in particular flexible PVC for external applications, for example as roof membranes or agricultural sheeting, is in some cases exposed to weathering for some time. Roof membranes, for example, usually have a service life of more than 15 years. It is known that a significant loss of material properties can occur over the life of the materials. Typical problems which occur on recycling, reprocessing of the recycled material or mixtures of used and new PVC during sheeting production by, for example, calendering are adhesion to the hot metal surfaces and a drastic drop In thermal stability. This disasterously adverse effect of the used material on recycling is also found even In mixtures containing a relatively low proportion of used material.

The object of the present invention was therefore to provide stabilized PVC containing recycled material, where the stabilizers used are ecologically acceptable and at the same time enable processing without adhesion to the metal surfaces of the processing machine and without significant decomposition (discoloration) of the PVC. In particular, stabilizers containing lead or cadmium should be avoided.

It has now been found that PVC which contains recycled material and has been stabilized using a mixture of at least one lubricant and a stabilizer containing no lead or cadmium compounds has excellent thermal stability and good processing properties.

The invention therefore proposes stabilized PVC containing recycled material, which comprises (a) PVC containing at least 1% of recycled materials (b) at least one lubricant and (c) at least one stabilizer containing no lead or cadmium compound, (c) being a metal salt of a fatty acid and a terminal epoxide compound.

For the purposes of this invention, (a) PVC Is also taken to mean copolymers or graft polymers of PVC with polymerizable compounds, such as acrylonitrile, vinyl acetate or ABS, and also includes suspension, bulk and emulsion polymers. However, PVC for the purposes of this invention does not include postchlorinated PVC. Preference is given to PVC as a suspension, bulk or emulsion polymer, including in combination with polyacrylates.

The recycled material is recycled PVC, for example flexible PVC from external applications, such as agricultural sheeting or PVC roof membranes which has been exposed to extended weathering.

The recycled material can also contain small amounts of foreign materials, for example bitumen, paper, pigments and adhesives, which are frequently difficult to remove. These foreign materials can also originate from contact with diverse substances during use or processing, for example paint components, metal traces, initiator residues, dirt, fertilizers or traces of water. Small amounts of foreign polymers, for example polyethylene or EVA, can also be present as a consequence of collection of used material.

The recycled material content is, for example, 1–100%, for example 2–10%. The proportion of recycled material is preferably at least 2%, particularly preferably at least 5%, based on the total amount of stabilized PVC.

Preferred stabilized PVC containing recycled material is that as described above, wherein (b) is at least one lubricant selected from the group consisting of $C_8$–$C_{40}$fatty alcohols, $C_8$–$C_{40}$fatty acids, $C_8$–$C_{40}$fatty acid esters, $C_8$–$C_{40}$fatty amides, liquid or solid paraffins, high-density polyethylene waxes (M~3000–9000) and low-density polyethylene waxes (M~2000). Suitable lubricants are also described in "Plastics Additives", Edited by H. Gächter and H. Müller, Hanser Verlag, 3rd Edition, 1990, pages 466–470. The lubricant is preferably an externally acting lubricant, particular preference being given to polyethylene waxes or stearic acids. Very particular preference is given to an oxidized polyethylene wax or stearic acid.

The lubricant can, if desired, alternatively be a mixture of said compounds.

The lubricant can be employed in an amount of, for example, from 0.1 to 10 parts by weight, preferably from 0.1 to 5 parts by weight, In particular from 0.1 to 2 parts by weight, based on 100 parts by weight of PVC.

The stabilizer (c) containing no lead or cadmium compounds is, in particular, a metal salt of a fatty acid in combination with a terminal epoxide compound.

Suitable metal salts of fatty acids are, in particular, those of elements from main group or sub-group II or aluminium or tin.

These are, in particular, tin salts or preferably calcium, zinc, magnesium or aluminium salts from the series consisting of aliphatic saturated $C_2$–$C_{22}$carboxylates, aliphatic olefinic $C_3$–$C_{22}$carboxylates, aliphatic $C_2$–$C_{22}$carboxylates which are substituted by at least one OH group, cyclic or bicyclic $C_6$–$C_{22}$carboxylates, aromatic $C_7$–$C_{22}$carboxylates, aromatic $C_7$–$C_{22}$carboxylates which are substituted by at least one OH group, $C_1$–$C_{16}$alkyl-substituted phenylcarboxylates and phenyl-$C_1$–$C_{16}$alkylcarboxylates, preference being given to behenates, in particular stearates, oleates and laurates.

Very particular preference is given to calcium stearate, zinc octanoate, zinc oleate, zinc stearate and zinc laurate.

The metal salt of a fatty acid can, if desired, also be a mixture of said compounds.

The metal salt of a fatty acid can be employed in an amount of, for example, from 0.01 to 10 parts by weight, preferably from 0.01 to 5 parts by weight, in particular from 0.1 to 2 parts by weight, based on 100 parts by weight of PVC.

The terminal epoxide compounds which can be used for the purposes of the invention can have an aliphatic, aromatic, cycloaliphatic, araliphatic or heterocyclic structure; they contain epoxide groups as side groups. The epoxide groups are preferably bonded to the remainder of the molecule as glycidyl groups via ether or ester bonds, or they are N-glycidyl derivatives of heterocyclic amines, amides or imides. Epoxide compounds of these types are known in general terms and are commercially available.

The terminal epoxide compounds contain at least one epoxide radical, in particular of the formula I

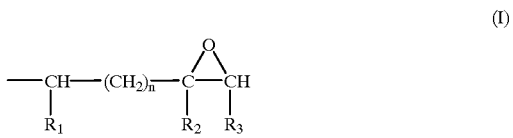

(I)

where $R_1$ and $R_3$ are both hydrogen, $R_2$ is hydrogen or methyl, and n is 0, or in which $R_1$ and $R_3$ together are —$CH_2$—$CH_2$— or —$CH_2$—$CH_2$—$CH_2$—, $R_2$ is then hydrogen, and n is 0 or 1 and this epoxide radical is bonded directly to carbon, oxygen, nitrogen or sulfur atoms.

Examples which may be mentioned of epoxide compounds are:

I) Glycidyl and β-methylglycidyl esters obtainable by reacting a compound containing at least one carboxyl group in the molecule and epichlorohydrin or glycerol dichlorohydrin or β-methylepichlorohydrin. The reaction is preferably carried out in the presence of bases.

The compounds containing at least one carboxyl group in the molecular can be aliphatic carboxylic acids. Examples of these carboxylic acids are glutaric acid, adipic acid, pimelic acid, suberic acid, azelaic acid, sebacic acid or dimerized or trimerized linoleic acid, acrylic acid, methacrylic acid, caproic acid, caprylic acid, lauric acid, myristic acid, palmitic acid, stearic acid and pelargonic acid, and the acids mentioned under the organic zinc compounds.

However, it is also possible to employ cycloaliphatic carboxylic acids, for example cyclohexanecarboxylic acid, tetrahydrophthalic acid, 4-methyltetrahydrophthalic acid, hexahydrophthalic acid or 4-methylhexahydrophthalic acid.

It is also possible to use aromatic carboxylic acids, for example benzoic acid, phthalic acid, isophthalic acid, trimellitic acid or pyromellitic acid.

It is likewise possible to use carboxyl-terminated adducts, for example of trimellitic acid and polyols, for example glycerol or 2,2-bis(4-hydroxycyclohexyl)propane.

Other epoxide compounds which can be used for the purposes of the present invention are given in EP-A 506 617.

II) Glycidyl or β-methylglycidyl ethers obtainable by reacting a compound containing at least one free alcoholic hydroxyl group and/or phenolic hydroxyl group and a suitably substituted epichlorohydrin under alkaline conditions, or in the presence of an acid catalyst followed by alkali treatment.

Ethers of this type are derived, for example, from acyclic alcohols, such as ethylene glycol, diethylene glycol and higher poly-(oxyethylene) glycols, propane-1,2-diol or poly (oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, bistrimethylolpropane, pentaerythritol, sorbitol, and from polyepichlorohydrins, butanol, amyl alcohol, pentanol and from monofunctional alcohols such as isooctanol, 2-ethylhexanol, isodecanol and $C_7$–$C_9$ alkanol and $C_9$–$C_{11}$ alkanol mixtures.

However, they are also derived, for example, from cycloaliphatic alcohols such as 1,3- or 1,4-dihydroxycyclohexane, bis(4-hydroxycyclohexyl)methane, 2,2-bis(4-hydroxycyclohexyl)propane or 1,1-bis (hydroxymethyl)cyclohex-3-ene, or they contain aromatic rings, such as N,N-bis(2-hydroxyethyl)aniline or p,p'-bis(2-hydroxyethylamino)diphenylmethane.

The terminal epoxide compounds can also be derived from monocyclic phenols, for example from phenol, resorcinol or hydroquinone; or they are based on polycyclic phenols, for example on bis(4-hydroxyphenyl)methane, 2,2-bis(4-hydroxyphenyl)propane, 2,2-bis(3,5-dibromo-4-hydroxyphenyl)propane, 4,4'-dihydroxydiphenyl sulfone or on condensation products of phenols with formaldehyde obtained under acid conditions, such as phenol novolaks.

Examples of other possible teminal epoxides are: glycidyl 1-naphthyl ether, glycidyl 2-phenylphenyl ether, 2-biphenyl glycidyl ether, N-(2,3-epoxypropyl)phthalimide and 2,3-epoxypropyl-4-methoxyphenyl ether.

III) N-Glycidyl compounds obtainable by dehydrochlorinating the products of the reaction of epichlorohydrin with amines containing at least one amino hydrogen atom. These amines are, for example, aniline, N-methylaniline, toluidine, n-butylamine, bis(4-aminophenyl)methane, m-xylylenediamine or bis(4-methylaminophenyl)methane, but also N,N,O-triglycidyl-m-aminophenol oder N,N,O-triglycidyl-p-aminophenol.

However, the N-glycidyl compounds also include N,N'-di-, N,N',N"-tri- and N,N',N",N'"-tetraglycidyl derivatives of cycloalkyleneureas, such as ethyleneurea or 1,3-propyleneurea, and N,N'-diglycidyl derivatives of hydantoins, such as of 5,5-dimethylhydantoin or glycol uril and triglycidyl isocyanurate.

IV) S-Glycidyl compounds, for example di-S-glycidyl derivatives derived from dithiols, for example ethane-1,2-dithiol or bis(4-mercaptomethylphenyl) ether.

V) Terminal epoxide compounds containing a radical of the formula I in which $R_1$ and $R_3$ together are —$CH_2$—$CH_2$—, and n is 0, are bis(2,3-epoxycyclopentyl) ether, 2,3-epoxycyclopentyl glycidyl ether or 1,2-bis(2,3-epoxycyclopentoxy)ethane. An example of a terminal epoxy resin containing a radical of the formula I in which $R_1$ and $R_3$ together are —$CH_2$—$CH_2$— and n is in 1 is (3',4'-epoxy-6'-methylcyclohexyl)methyl 3,4-epoxy-6-methylcyclohexanecarboxylate.

Examples of suitable terminal epoxides are:

a) liquid bisphenol A diglycidyl ethers, such as Araldit® GY 240, Araldit® GY 250, Araldit® GY 260, Araldit® GY 266, Araldit® GY 2600, Araldit® MY 790;

b) solid bisphenol A diglycidyl ethers, such as Araldit® GT 6071, Araldit® GT 7071, Araldit® GT 7072, Araldit® GT 6063, Araldit® GT 7203, Araldit® GT 6064, Araldit® GT 7304, Araldit® GT 7004, Araldit® GT 6084, Araldit® GT 1999, Araldit® GT 7077, Araldit® GT 6097, Araldit® GT 7097, Araldit® GT 7008, Araldit® GT 6099, Araldit® GT 6608, Araldit® GT 6609, Araldit® GT 6610;

c) liquid bisphenol F diglycidyl ethers, such as Araldit® GY 281, Araldit® PY 302, Araldit® PY 306;

d) solid polyglycidyl ethers of tetraphenylethane, such as CG Epoxy Resin® 0163;

e) solid and liquid polyglycidyl ethers of phenol-formaldehyd novolak, such as EPN 1138, EPN 1139, GY 1180, PY 307;

f) solid and liquid polyglycidyl ethers of o-cresol-formaldehyde novolak, such as ECN 1235, ECN 1273, ECN 1280, ECN 1299;

g) liquid glycidyl ethers of alcohols such as Shell® glycidyl ether 162, Araldit® DY 0390, Araldit® DY 0391;

h) liquid glycidyl ethers of carboxylic acids, such as Shell® Cardura E terephthalates, trimellitates, Araldit® PY 284;

i) solid heterocyclic epoxy resins (triglycidyl isocyanates), such as Araldit® PT 810;

j) liquid cycloaliphatic epoxy resins, such as Araldit® CY 179;

k) liquid N,N,O-triglycidyl ether of p-aminophenol such as Araldit® MY 0510;

l) tetraglycidyl-4-4'-methylenebenzamine or N,N,N',N'-tetraglycidyldiaminophenylmethane such as Araldit® MY 720, Araldit® MY 721.

Preference is given to terminal epoxide compounds containing two functional groups. However, it is in principle possible for terminal epoxide compounds containing one, three or more functional groups to be used.

Predominantly employed are terminal epoxide compounds, in particular diglycidyl compounds, containing aromatic structures.

If desired, a mixture of terminal epoxide compounds having different structures can also be employed.

Particularly preferred terminal epoxide compounds are diglycidyl ethers based on bisphenols, for example on 2,2-bis(4-hydroxyphenyl)propane (bisphenol A), bis(4- hydroxyphenyl)methane or mixtures of bis(ortho/para-hydroxyphenyl)methane (bisphenol F).

The terminal epoxide compounds can be employed in an amount of preferably at least 0.1 part by weight, for example from 0.1 to 30 parts by weight, preferably from 0.1 to 20 parts by weight, in particular from 0.1 to 10 parts by weight, based on 100 parts by weight of PVC. In a preferred embodiment, the recycled material according to the invention also contains further additives, in particular: 1,3-diketo compounds, plasticizers (for example as in EP-A 421 933, p. 22, line 58, to p. 23, line 53), fillers and reinforcing materials (for example silicates, glass fibres, talcs, kaolin, chalk, mica, carbon black or graphite), antioxidants (in particular phenolic antioxidants; for example in EP-A 421 933, p. 24, line 58, to p. 25, line 45), polyols (for example as in EP-A 421 933, p. 24, line 50 to p. 24, line 55), zeolites (for example as in EP-A 625 546), hydrotalcites (for example as in EP-A 421 933, p. 3, line 9, to p. 3, line 45, and in EP-A 625 546), organic phosphites and phosphonites (for example as in EP-A 421 933, p. 24, line 9, to p. 24, line 35), dihydropyridines, sterically hindered amines (HALS) (for example as in EP-A 421 933, p. 6, line 26, to p. 21, line 2), light stabilizers (for example as in EP-A 421 933, p. 25, line 46, to p. 26, line 16), UV absorbers (for example as in EP-A 421 933, p. 25, line 46, to p. 26, line 16), tin stabilizers, blowing agents, optical brighteners, pigments, flameproofing agents, antistatics, β-aminocrotonates (for example as mentioned in EP-A 465 405, p. 6, lines 9–14), phosphates, thiophosphates, gelling aids, peroxide scavengers (for example as in EP-A 421 933, p. 26, line 25, to p. 26, line 28), modifiers and further complex agents for Lewis acids. Further details and examples of said additives are given in "Plastics Additives Handbook"; Gächter/Müller, 3rd Edn., 1990, in particular in chapters 4 and 5, EP-A 421 933 and EP-A 625 546.

The further additives can be used in an amount of, for example, from 0.01 to 50 parts by weight, preferably from 0.01 to 30 parts by weight, in particular from 0.01 to 10 parts by weight, based on 100 parts by weight of recycled material. If fillers are used, the upper limits stated can also be exceeded and, for example, up to 80 parts by weight of further additives can be used.

The stabilized PVC is preferably flexible PVC as mentioned above. Flexible PVC is taken to mean, in accordance with ASTM D 883-93, a PVC which has a modulus of elasticity of less than 700 MPa at 23° C. and 50% relative humidity, the determination being carried out analogously to ASTM D 747, D 790, D 638 or D 882 (1983). Flexible PVC usually contains one or more plasticizers. Industrially important plasticizers for PVC are organic plasticizers, for example those from the following groups:

A) Phthalates (esters of phthalic acid)

Examples of these plasticizers are dimethyl, diethyl, dibutyl, dihexyl, di-2-ethylhexyl, di-n-octyl, diisooctyl, diisononyl, diisodecyl, diisotridecyl, dicyclohexyl, di-methylcyclohexyl, dimethyl glycol, dibutyl glycol, benzyl butyl and diphenyl phthalates, and mixtures of phthalates, such as $C_7$–$C_9$- and $C_9$–$C_{11}$alkyl phthalates made from predominantly linear alcohols, $C_6$–$C_{10}$-n-alkyl phthalates and $C_8$–$C_{10}$-n-alkyl phthalates. Preference is given to dibutyl, dihexyl, di-2-ethylhexyl, di-n-octyl, diisooctyl, diisononyl, diisodecyl, diisotridecyl and benzyl butyl phthalates, and said mixtures of alkyl phthalates. Particular preference is given to di-2-ethylhexyl, diisononyl and diisodecyl phthalate.

B) Esters of aliphatic dicarboxylic acids, in particular of adipic, azelaic and sebacic acids Examples of these plasticizers are di-2-ethylhexyl adipate, diisooctyl adipate (mixture), di-isononyl adipate (mixture), diisodecyl adipate (mixture), benzyl butyl adipate, benzyl octyl adipate, di-2-ethylhexyl azelate, di-2-ethylhexyl sebacate and diisodecyl sebacate (mixture). Preference is given to di-2-ethylhexyl adipate and diisooctyl adipate.

C) Esters of trimellitic acid for example tri-2-ethylhexyl trimellitate, triisodecyl trimellitate (mixture), triisotridecyl trimellitate, triisooctyl trimellitate (mixture) and tri-$C_6$–$C_8$alkyl, tri-$C_6$–$C_{10}$alkyl, tri-$C_7$–$C_9$alkyl- and tri-$C_9$–$C_{11}$alkyl trimellitates. The last-mentioned trimellitates are formed by esterifying trimellitic acid by means of the appropriate alkanol mixtures. Preferred trimellitates are tri-2-ethylhexyl trimellitate and said trimellitates made from alkanol mixtures.

D) Epoxide plasticizers, for example epoxidized soybean oil, linseed oil or octyl oleate.

E) Polymer plasticizers

A definition of these plasticizers and examples thereof are given in "Plastics Additives", edited by H. Gächter and H. Müller, Hanser Verlag, 1990, page 393–396, and in "PVC Technology", edited by W. V. Titow, 4th. Ed., Elsevier Publ., 1984, pages 165–170. The most usual starting materials for the preparation of polyester plasticizers are: dicarboxylic acids, such as adipic, phthalic, azelaic and sebacic acids; diols, such as 1,2-propanediol, 1,3-butanediol, 1,4-butanediol, 1,6-hexanediol, neopentyl glycol and diethylene glycol; monocarboxylic acids, such as acetic, caproic, caprylic, lauric, myristic, palmitic, stearic, pelargonic and benzoic acids; monofunctional alcohols, such as isooctanol, 2-ethylhexanol, isodecanol and $C_7C_9$alkanol and $C_9$–$C_{11}$alkanol mixtures. Particularly advantageous are polyester plasticizers made from said dicarboxylic acids and monofunctional alcohols.

F) Esters of phosphoric acid

A definition of these esters is given in the abovementioned book "Plastics Additives" on pages 390–393. Examples of these phosphates are tributyl phosphate, tri-2-ethylbutyl phosphate, tri-2-ethylhexyl phosphate, trichloroethyl phosphate, 2-ethylhexyl diphenyl phosphate, cresyl diphenyl phosphate, triphenyl phosphate, tricresyl phosphate and trixylenyl phosphate. Preference is given to tri-2-ethylhexyl phosphate and ®Reofos 50.

G) Chlorinated hydrocarbons (paraffins)

H) Hydrocarbons

I) Monoesters, for example butyl oleate, phenoxyethyl oleate, tetrahydrofurfuryl oleate and esters of alkylsulfonic acids.

J) Glycol esters, for example diglycol benzoate, butylphthalyl butyl glycolate, dipropylene glycol dibenzoate or neopentyl glycol dibenzoate.

Definitions and examples of plasticizers from groups G) to J) are given in the following handbooks:

"Plastics Additives", edited by H. Gächter and H. Müller, Hanser Publishers, 1990, pages 403–405 (Group G)), and page 403 (Group H)).

"PVC Technology", edited by W. V. Titow, 4th. Ed., Elsevier Publishers, 1984, pages 171–173, chapter 6.10.2 (Group G)), page 174, chapter 6.10.5 (Group H)), page 173, chapter 6.10.3 (Group 1)) and pages 173–174, chapter 6.10.4 (Group J)).

Particular preference is given to plasticizers from groups A) to F), in particular A) to D) and F), especially the plasticizers in these groups which have been mentioned as preferred.

It is also possible to use mixtures of different plasticizers.

The plasticizers can be used in an amount of, for example, from 5 to 120 parts by weight, preferably from 10 to 100 parts by weight, in particular from 20 to 70 parts by weight, based on 100 parts by weight of PVC.

Additional plasticizers may be necessary, in particular, at high content of recycled material, since a reduction in the plasticizer concentration frequently occurs during use.

Preference is furthermore given to stabilized PVC containing recycled material which comprises a 1,3-dicarbonyl compound, which can be in the form of a linear or cyclic dicarbonyl compound. Preference is given to dicarbonyl compounds of the formula II

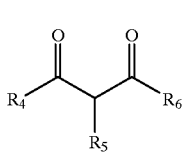

(II)

in which $R_4$ $C_1$–$C_{22}$alkyl, $C_5$–$C_{10}$hydroxyalkyl, $C_2$–$C_{18}$alkenyl, phenyl, phenyl which is substituted by OH, $C_1$–$C_4$alkyl, $C_1$–$C_4$alkoxy or halogen, $C_7$–$C_{10}$phenylalkyl, $C_5$–$C_{12}$cycloalkyl, $C_5$–$C_{12}$cycloalkyl which is substituted by $C_1$–$C_4$alkyl, or an —$R_8$—S—$R_9$ or —$R_8$—O—$R_9$ group, $R_5$ is hydrogen, $C_1$–$C_8$alkyl, $C_2$–$C_{12}$alkenyl, phenyl, $C_7$$C_{12}$alkylphenyl, $C_7$$C_{10}$phenylalkyl or a —CO—$R_4$ group, $R_6$ has one of the meanings given for $R_4$ or is $C_1$–$C_{18}$alkoxy, $R_7$ is $C_1$–$C_4$alkyl or phenyl, $R_8$ is $C_1$–$C_{10}$alkylene, and $R_9$ is $C_1$–$C_{12}$alkyl, phenyl, $C_7$–$C_{18}$alkylphenyl or $C_7$–$C_{10}$-phenylalkyl.

These include the hydroxyl-containing diketones of EP-A 346 279, the oxa- and thiadiketones of EP-A-307 358, and the isocyanuric acid-based diketones of U.S. Pat. No. 4,339, 383.

Alkyl $R_4$ und $R_6$ can be, in particular $C_1$–$C_{,8}$alkyl, for example methyl, ethyl, n-propyl, Isopropyl, n-butyl, tert-butyl, pentyl, hexyl, heptyl, octyl, decyl, dodecyl or octadecyl.

Hydroxyalkyl $R_4$ and $R_6$ are, in particular, a —$(CH_2)_m$—OH group, in which m is 5, 6 or 7.

Alkenyl $R_4$ and $R_6$ can be, for example, vinyl, allyl, methallyl, 1-butenyl, 1-hexenyl or oleyl, preferably allyl.

OH—, alkyl-, alkoxy- or halogen-substituted phenyl $R_4$ and $R_6$ can be, for example, tolyl, xylyl, tert-butylphenyl, methoxyphenyl, ethoxyphenyl, hydroxyphenyl, chlorophenyl or dichlorophenyl.

Phenylalkyl $R_4$ and $R_6$ are, in particular, benzyl cycloalkyl or alkylcycloalkyl $R_5$ and $R_6$ are, in particular, cyclohexyl or methylcyclohexyl.

Alkyl $R_5$ can be, in particular, $C_1$–$C_4$alkyl. $C_2$–$C_{12}$alkenyl $R_5$ can be, in particular, allyl.

Alkylphenyl $R_5$ can be, in particular, tolyl. Phenylalkyl $R_5$ can be, in particular, benzyl. $R_5$ is preferably hydrogen. Alkoxy $R_6$ can be, for example, methoxy, ethoxy, butoxy, hexyloxy, octyloxy, dodecyloxy, tridecyloxy, tetradecyloxy or octadecyloxy.

$C_1$–$C_{10}$alkylene $R_8$ is in particular $C_2$–$C_4$alkylene.

Alkyl $R_9$ is, in particular, $C_4$–$C_{12}$alkyl, for example butyl, hexyl, octyl, decyl or dodecyl.

Alkylphenyl $R_9$ is, in particular, tolyl. Phenylalkyl $R_9$ is, in particular, benzyl.

Examples of 1,3-dicarbonyl compounds of the formula II are acetylacetone, butanoylacetone, heptanoylacetone, stearoylacetone, palmitoylacetone, lauroylacetone, 7-tert.nonylthioheptane-2,4-dione, benzoylacetone, dibenzoylmethane, lauroylbenzoylmethane, palmitoylbenzoylmethane, stearoyl-benzoylmethane, 5-hydroxycapronylbenzoylmethane, tribenzoylmethane, bis(4-methylbenzoyl)methane, benzoyl-p-chlorobenzoylmethane, bis(2-hydroxybenzoyl)methane, 4-methoxybenzoyl-benzoylmethane, bis(4-methoxybenzoyl)methane, 1-benzoyl-1-acetylnonane, benzoylacetylphenylmethane, stearoyl-4-methoxybenzoylmethane, bis(4-tert-butylbenzoyl)methane, benzoylformylmethane, benzoylphenylacetylmethane, bis(cyclohexanoyl)methane, di(pivaloyl)methane, methyl, ethyl, hexyl, octyl, dodecyl or octadecyl acetoacetate, ethyl, butyl, 2-ethylhexyl, dodecyl or octadecyl benzoylacetate, ethyl, propyl, butyl, hexyl or octyl stearoylacetate and dehydracetic acid, and the zinc or magnesium salts thereof.

Preference is given to 1,3-diketo compounds of the formula II in which, $R_4$ is $C_1$–$C_{18}$alkyl, phenyl, phenyl which is substituted by OH, methyl or methoxy, $C_7$–$C_{10}$phenylalkyl or cyclohexyl, $R_5$ is hydrogen, and $R_6$ has one of the meanings given for $R_4$.

The 1,3-diketo compounds can be used in an amount of, for example, from 0.01 to 10 parts by weight, preferably from 0.01 to 2 parts by weight, in particular from 0.1 to 1 part by weight, based on 100 parts of weight of PVC.

Examples of suitable antioxidants are:

1. Alkylated monophenols, for example 2,6-di-tert-butyl-4-methylphenol,
 2-butyl-4,6-dimethylphenol, 2,6-di-tert-butyl-4-ethylphenol,
 2,6-di-tert-butyl-4-n-butylphenol, 2,6-di-tert-butyl-4-isobutylphenol,
 2,6-dicyclopentyl-4-methylphenol, 2-(α-methylcyclohexyl) 4,6-dimethylphenol,
 2,6-dioctadecyl-4-methylphenol, 2,4,6-tricyclohexylphenol,
 2,6-di-tert-butyl-4-methoxymethylphenol, 2,6-dinonyl-4-methylphenol,
 2,4-dimethyl-6-(1'-methylundec-1'-yl)phenol,
 2,4-dimethyl-6-(1'-methylheptadec-1'-yl)phenol,
 2,4-dimethyl-6-(1'-methyltridec-1'-yl)phenol, octylphenol, nonylphenol and mixtures thereof.

2. Alkylthiomethylphenols, for example 2,4-dioctylthiomethyl-6-tert-butylphenol,
 2,4-dioctylthiomethyl-6-methylphenol, 2,4-dioctylthiomethyl-6-ethylphenol,
 2,6-didodecylthiomethyl-4-nonylphenol.

3. Hydroquinones and alkylated hydroquinones, for example 2,6-di-tert-butyl-4-methoxyphenol, 2,5-di-tert-butyl-hydroquinone,
 2,5-di-tert-amyl-hydroquinone, 2,6-diphenyl-4-octadecyloxyphenol,
 2,6-di-tert-butyl-hydroquinone, 2,5-di-tert-butyl-4-hydroxyanisole,
 3,5-di-tert-butyl-4-hydroxyanisole, 3,5-di-tert-butyl-4-hydroxyphenyl stearate,
 bis(3,5-di-tert-butyl-4-hydroxyphenyl)adipate.

4. Hydroxylated diphenyl thioethers, for example 2,2'-thiobis(6-tert-butyl-4-methylphenol), 2,2'-thiobis(4-octylphenol),
 4,4'-thiobis(6-tert-butyl-3-methylphenol), 4,4'-thiobis(6-tert-butyl-2-methylphenol),
 4,4'-thiobis(3,6-di-sec-amylphenol), 4,4'-bis(2,6-dimethyl-4-hydroxyphenyl) disulfide.

5. Alkylidenebisphenols, for example 2,2'-methylene-bis(6-tert-butyl-4-methylphenol), 2,2'-methylene-bis(6-tert-butyl-4-ethylphenol),
2,2'-methylene-bis[4-methyl-6-(α-methylcyclohexyl) phenol],
2,2'-methylene-bis(4-methyl-6-cyclohexylphenol),
2,2'-methylene-bis(6-nonyl-4-methylphenol), 2,2'-methylene-bis(4,6-di-tert-butylphenol),
2,2-ethylidene-bis(4,6-di-tert-butylphenol),
2,2'-ethylidene-bis(6-tert-butyl-4-isobutylphenol),
2,2'-methylene-bis[6-(α-methylbenzyl)-4-nonylphenol],
2,2'-methylene-bis[6-(α,α-dimethylbenzyl)4-nonylphenol],
4,4'-methylene-bis(2,6di-tert-butylphenol), 4,4'-methylene-bis-(6-tert-butyl-2-methylphenol),
1,1-bis(5-tert-butylhydroxy-2-methylphenyl)butane,
2,6-bis(3-tert-butyl-5-methyl-2-hydroxybenzyl)4-methylphenol,
1,1,3-tris(5-tert-butyl-4-hydroxy-2-methylphenyl)butane,
1,1-bis(5-tert-butyl-4-hydroxy-2-methylphenyl)-3-n-dodecylmercaptobutane,
ethylene glycol bis [3,3-bis-(3'-tert-butyl-4'-hydroxyphenyl) butyrate],
bis(3-tert-butyl-4-hydroxy-5-methylphenyl) dicyclopentadiene,
bis[2-(3'-tert-butyl-2'-hydroxy-5'-methylbenzyl)-6-tert-butyl-4-methylphenyl]terephthalate,
1,1-bis(3,5-dimethyl-2-hydroxyphenyl)butane,
2,2-bis(3,5-di-tert-butyl-4-hydroxyphenyl)propane, 2,2-bis (4hydroxyphenyl)propane,
2,2-bis(5-tert-butyl-4-hydroxy-2-methylphenyl)4-n-dodecylmercaptobutane,
1,1,5,5-tetra(5-tert-butyl-4-hydroxy-2-methylphenyl) pentane.
6. O-, N- and S-benzyl compounds, for example
3,5,3',5'-tetra-tert-butyl -4,4'-dihydroxydibenzyl ether, octadecyl
4-hydroxy-3,5-dimethylbenzylmercaptoacetate,
tris(3,5-di-tert-butyl-4-hydroxybenzyl)amine,
bis(4tert-butyl-3-hydroxy-2,6-dimethylbenzyl) dithioterephthalate,
bis(3,5-di-tert-butyl-4-hydroxybenzyl) sulfide, isooctyl 3,5di-tert-butyl-4-hydroxybenzylmercaptoacetate.
7. Hydroxybenzylated malonates, for example dioctadecyl 2,2-bis(3,5-di-tert-butyl-2-hydroxybenzyl)malonate, dioctadecyl
2-(3-tert-butyl-4-hydroxy-5-methylbenzyl)malonate, didodecylmercaptoethyl
2,2-bis(3,5-di-tert-butyl-4-hydroxybenzyl)malonate,
di[4-(1,1,3,3-tetramethylbutyl)phenyl]2,2-bis(3,5-di-tert-butyl-4-hydroxybenzyl)malonate.
8. Hydroxybenzylaromatic compounds, for example
1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.
9. Triazine compounds, for example
2,4-bisoctylmercapto-6-(3,5-di-tert-butyl-4-hydroxyanilino)-1,3,5-triazine,
2-octylmercapto-4,6-bis(3,5-di-tert-butyl-4-hydroxyanilino)-1,3,5-triazine,
2-octylmercapto-4,6-bis(3,5-di-tert-butyl-4-hydroxyphenoxy)-1,3,5-triazine,
2,4,6-tris(3,5-di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine,
1,3,5-tris(3,5-di-tert-butyl-4-hydroxyphenylpropionyl) hexahydro-1,3,5-triazine,
1,3,5-tris(3,5-dicyclohexyl-4hydroxybenzyl) isocyanurate.
10. Phosphonates, phosphites and phosphonites, for example dimethyl 2,5-di-tert-butyl-4-hydroxy-benzylphosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzylphosphonate, the calcium salt of monoethyl 3,5-di-tert-butyl-4-hydroxybenzyl phosphonate, triphenyl phosphite, diphenyl alkyl phosphites, phenyl dialkyl phosphites, tris(nonylphenyl) phosphite, trilauryl phosphite, tridecyl phosphite, trioctadecyl phosphite, distearyl pentaerythrityl diphosphite, tris (2,4di-tert-butylphenyl) phosphite, diisodecyl pentaerythrityl diphosphite, bis(2,4-di-tert-butylphenyl) pentaerythrityl diphosphite, bis(2,6di-tert-butyl-4-methylphenyl) pentaerythrityl diphosphite, bisisodecyloxy pentaerythrityl diphosphite, bis(2,4-di-tert-butyl-6-methylphenyl) pentaerythrityl diphosphite, bis(2,4,6-tri-tert-butylphenyl) pentaerythrityl diphosphite, tristearyl sorbitol triphosphite, tetrakis(2,4-di-tert-butylphenyl)-4, 4'-biphenylene diphosphonite, 6-isooctyloxy-2,4,8, 10tetra-tert-butyl-12H-dibenz[d,g]-1,3,2-dioxaphosphocine, 6-fluoro-2,4,8,10-tetra-tert-butyl-1 2-methyldibenz[d,g]-1,3,2-dioxaphosphocine, bis(2,4-di-tert-butyl-4-methylphenyl) methyl phosphite, bis(2,4-di-tert-butyl-6-methylphenyl) ethyl phosphite, $(C_{19}H_{19}—C_6H_4)_{1,5}—P—(O—C_{12-13}H_{25-27})_{1,5}$, 2,2',2"-nitrilo [triethyl tris(3,3',5,5'-tetra-tert-butyl-1 1'-biphenyl-2,2'-diyl) phosphite], 2-ethylhexyl(3,3',5,5'-tetra-tert.-butyl-1, 1'-biphenyl-2,2'-diyl) phosphite.
11. Acylaminophenols, for example 4-hydroxylauranilide, 4-hydroxystearanilide, octyl N-(3,5-di-tert-butyl-4-hydroxyphenyl)carbamate.
12. Esters of >(3,5-i-tert-butyl-4-hydroxyphenyl)propionic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxalamide, 3-thiaundecanol, 3-thiapentadecanol, trimethylhexanediol, trimethylolpropane, 4hydroxymethyl-1-phospha-2,6,7-trioxabicyclo-[2.2.2]-octane.
13. Esters of β-(5-tert-butyl-4-hydroxy-3-methylphenyl) propionic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxalamide, 3-thiaundecanol, 3-thiapentadecanol, trimethylhexanediol, trimethylolpropane, 4hydroxymethyl-1-phospha-2,6,7-trioxabicyclo-[2.2.2]-octane.
14. Esters of β-(3,5-dicyclohexyl-4-hydroxyphenyl) propionic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxalamide, 3-thiaundecanol, 3-thiapentadecanol, trimethylhexanediol, trimethylolpropane, 4-hydroxymethyl-1-phospha-2,6,7-trioxabicyclo-[2.2.2]-octane.
15. Esters of 3,5-di-tert-butyl-4-hydroxyphenylacetic acid with monohydric or polyhydric alcohols, for example with methanol, ethanol, octanol, octadecanol, 1,6hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxalamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

16. Amides of β-(3,5-di-tert-butyl-4-hydroxyphenyl) propionic acid, for example
N,N'-bis(3,5-di-tert-butyl-4-hydroxyphenylpropionyl) hexamethylenediamine,
N,N'-bis(3,5-di-tert-butyl-4-hydroxyphenylpropionyl) trimethylenediamine,
N,N'-bis(3,5-di-tert-butyl-4-hydroxyphenylpropionyl) hydrazine.

Preference is given to phenolic antioxidants, in particular from groups 1–5 and 12, and antioxidants from group 10; very particularly 2,2-bis(4-hydroxyphenyl)propane, and the esters of 3,5-di-tert-butyl-4-hydroxyphenylpropionic acid with octadecanol or pentaerythritol, or tris(2,4-di-tert-butylphenyl) phosphite.

If desired, a mixture of antioxidants having different structures can also be employed.

The antioxidants can be used in an amount of, for example, 0.01 to 10 parts by weight, preferably from 0.02 to 5 parts by weight, in particular from 0.05 to 2 parts by weight, based on 100 parts by weight of PVC.

Examples of suitable UV-absorber and light stabilizers are:

1. 2-(2'-Hydroxyphenyl)benzotriazoles, for example 2-(2'-hydroxy-5 4-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-((1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl) chlorobenzotriazole, 2-(3'-sec-butyl-5'-tert-butyl-2'-hydroxyphenyl)benzotriazole, 2-(2'-hydroxy-4'-octoxyphenyl)benzotriazole, 2-(3',5'-di-tert-amyl-2'-hydroxyphenyl)benzotriazole, 2-(3',5'-di-tert-butyl-2'-hydroxyphenyl)benzotriazole, mixture of 2-(3'-tert-butyl-hydroxy-5'-benzotriazole, 2-(3h-tert-butyl-5-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, and 2-(3'-tert-butyl-2-hydroxy-5'-(2-isooctyloxycarbonylethyl) phenylbenzotriazole, 2,2'-methylenebis[4-(1,1,3,3-tetramethylbutyl)-6-benzotriazol-2-ylphenol]; transesterification product of 2–13'-tert-butyl-5'-[(2-methoxycarbonylethyl)-2'-hydroxyphenyl]benzotriazole with polyethylene glycol 300; [R—$CH_2CH_2COO(CH_2)_3$—]$_2$ where R=3'-tert-butyl-4-hydroxy-5'-2H-benzotriazole-2-yl phenyl.

2. 2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy -4,4'-dimethoxy derivatives.

3. Esters of unsubstituted or substituted benzoic acids, for example 4-tert-butyl-phenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl--hydroxybenzoate, 2-methyl-4,6-di-tert-butylphenyl 3,5-di-tert-butyl-4-hydroxybenzoate.

4. Acrylates, for example ethyl and isooctyl α-cyano-β,β-diphenylacrylate, methyl α-carbomethoxycinnamate, methyl and butyl α-cyano-β-methyl-p-methoxycinnamate, methyl α-carbomethoxy-p-methoxycinnamate and N-(βcarbomethoxy-βcyanovinyl)-2-methylindoline.

5. Nickel compounds, for example nickel complexes of 2,2'-thiobis [4(1,1,3,3-tetramethylbutyl)phenol], such as the 1:1 and 1:2 complexes, if desired with additional ligands, such as n-butylamine, triethanolamine or N-cyclohexyldiethanolamine, nickel dibutyldithiocarbamate, nickel salts of monoalkyl esters, such as the methyl or ethyl esters, of 4-hydroxy-3,5-di-tert-butylbenzylphosphonic acid, nickel complexes of ketoximes, such as of 2-hydroxy-4-methylphenyl undecyl ketoxime, and nickel complexes of 1-phenyl-4-lauroyl-5-hydroxypyrazole, if desired with additional ligands.

6. Sterically hindered amines, for example bis(2,2,6,6-tetramethylpiperidyl) sebacate, bis(2,2,6,6-tetramethylpiperidyl) succinate, bis(1,2,2,6,6-pentamethylpiperidyl) sebacate, bis(1,2,2,6,6-pentamethylpiperidyl) n-butyl-3,5-di-tert-butyl-4-hydroxybenzylmalonate, the product of the condensation of 1-hydroxyethyl-2,2,6,6-tetramethyl-4-hydroxypiperidine and succinic acid, the linear or cyclic product of the condensation of N,N'-bis(2,2,6,6-tetramethyl-4-piperidyl) hexamethylenediamine and 4tert-octylamino-2,6-dichloro-1,3,5-s-triazine, tris(2,2,6,6-tetramethyl-4-piperidyl)nitrilotriacetate, tetrakis(2,2,6,6-tetramethyl-4-piperidyl) 1,2,3,4-butanetetraoate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl) 2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl) sebacate, bis(1-octyloxy-2,2,6,6-tetramethylpiperidyl) succinate, the product of the condensation of N,N'-bis(2,2,6,6-tetramethyl-4-piperidyl) hexamethylene diamine and 4-morpholino-2,6-dichloro-1,3,5-triazine, the product of the condensatoin of 2-chloro-4,6-di(4-n-butylamino-2,2,6,6-tetramethylpiperidyl)-1,3,5-triazine and 1,2-bis(3-aminopropylamino)ethane, the product of the condensation of 2-chloro-4,6-di(4n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl) pyrrolidine-2,5-dione, 3-dodecyl-1-(1,2,2,6,6-pentamethyl-4-piperidyl)pyrrolidine-2,5-dione.

7. Oxalamides, for example 4,4'-dioctyloxyoxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and mixtures thereof with 2-ethoxy-2'-ethyl-5,4'-di-tert-butyloxanilide, and mixtures of o- and p-methoxy- and of o- and p-ethoxy-disubstituted oxanilides.

8. 2-(2-Hydroxyphenyl)-1,3,5-triazines, for example 2,4,6-tris(2-hydroxy4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)4,6-bis(2,4-dimethylphenyl)-1,3,5-triazine, 2,4-bis(2-hydroxy4-propyloxyphenyl)-6-(2,4-dimethylphenyl)-1,3,5-triazine, 2-(2-hydroxy4-octyloxyphenyl)4,6-bis(4-methylphenyl)-1,3,5-triazine, 2-(2-hydroxy4-dodecyloxyphenyl)4,6-bis(2,4-dimethylphenyl)-1,3,5-triazine, 2-[2-hydroxy -4-(2-hydroxy-3-butyloxypropyloxy)phenyl]-4,6-bis(2,4-dimethylphenyl)-1,3,5-triazine, 2-[2-hydroxy4-(2-hydroxy-3-octyloxypropyloxy)phenyl]4,6-bis(2,4-dimethylphenyl)-1,3,5-triazine.

Examples of suitable peroxide scavengers are: esters of β-thiodipropionic acid, for example the lauryl, stearyl, myristyl or tridecyl esters, mercaptobenzimidazole, the zinc salt of 2-mercaptobenzimidazole, zinc dibutyldithiocarbamate, dioctadecyl disulfide, pentaerythrityl tetrakis(β-dodecylmercapto)propionate and ethylene glycol bismercaptoacetate.

Examples of suitable polyols are:
pentaerythritol, dipentaerythritol, tripentaerythritol, bistrimethylolpropane, bistrimethylolethane, trismethylolpropane, sorbitol, maltitol, isomaltitol, lactitol, isomaltol, lycasin, mannitol, lactose, leucrose, tris(hydroxyethyl) isocyanurate, palatinitol, tetramethylolcyclohexanol, tetramethylolcyclopentanol, tetramethylolcyclopyranol, glycerol, diglycerol, polyglycerol and 1-0-α-D-glycopyranosyl-D-mannitol dihydrate.

The polyols can be used in an amount of, for example, from 0.01 to 20 parts by weight, preferably from 0.1 to 20 parts by weight, in particular from 0.1 to 10 parts by weight, based on 100 parts by weight of PVC.

Suitable organic phosphites are in particular organic phosphites of the general formula P(OR)$_3$, where the radicals R are identical or different alkyl, alkenyl, aryl or aralkyl radicals. Preferred organic phosphites are those of the formulae

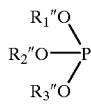

and

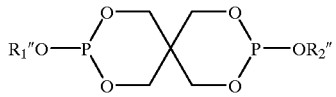

in which R$_1$", R$_2$" und R$_3$" are identical or different and are C$_6$–C$_{18}$alkyl, C$_6$–C$_{18}$alkenyl, a substituted or unsubstituted phenyl or C$_5$–C$_7$cycloalkyl.

C$_6$–C$_{18}$alkyl R$_1$", R$_2$" and R$_3$" are, for example, n-hexyl, n-octyl, n-nonyl, decyl, dodecyl, tetradecyl, hexadecyl or octadecyl. Preference is given to alkyl groups having 8 to 18 carbon atoms.

Substituted phenyl R$_1$", R$_2$" and R$_3$" are, for example, tolyl, ethylphenyl, xylyl, cumyl, cymyl, cresyl, 4-methoxyphenyl, 2,4-dimethoxyphenyl, ethoxyphenyl, butoxyphenyl, 2,4-di-tert-butylphenyl, 2,6-di-tert-butyl-4-methylphenyl, 2,4-di-tert-butyl-6-methylphenyl, p-n-octylphenyl, p-n-nonylphenyl or p-n-dodecylphenyl.

Particularly suitable phosphites are trioctyl, tridecyl, tridodecyl, tritetradecyl, tristearyl, trioleyl, triphenyl, tricresyl, tris-p-nonylphenyl and tricyclohexyl phosphites, and particular preference is given to aryl dialkyl phosphites and alkyl diaryl phosphites, for example phenyl didecyl, diphenyl decyl, 2,4-di-tert-butylphenyl didodecyl and 2,6-di-tert-butylphenyl didodecyl phosphites, and dialkyl and diaryl pentaerythrityl diphosphites, such as distearyl pentaerythrityl diphosphite and mixtures or di(2,4-di-tert-butylphenyl) pentaerythrityl diphosphite or di(2,6-di-tert-butyl-4-methylphenyl) pentaerythrityl diphosphite.

Preferred organic phosphites are distearyl pentaerythrityl diphosphite, trisnonylphenyl phosphite, tridecyl phosphite, diphenyl decyl phosphite, phenyl didecyl phosphite, didecyl nonylphenyl phosphite, tris(2,4-di-tert-butylphenyl) phosphite, di(2,4-di-tert-butyl-6-methylphenyl) ethyl phosphite, tetraisodecyl dipropylene glycol bisphosphonite and

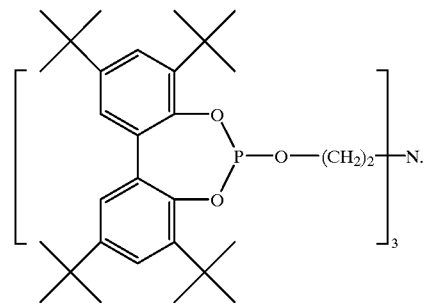

Also suitable are phosphites such as tetrakis(2,4-di-tert-butyl)-4,4'-biphenylene diphosphonite phonite, 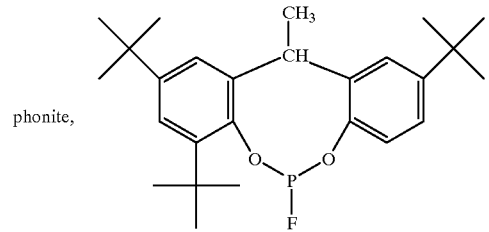

and 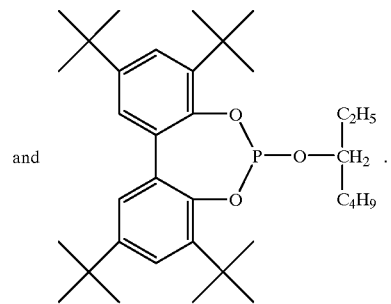

The units

used in the formulae denote tert-butyl.

The organic phosphites can be used in an amount of, for example, from 0.01 to 10 parts by weight, preferably from 0.02 to 5 parts by weight, in particular from 0.05 to 2 parts by weight, based on 100 parts by weight of PVC.

Preference is given to stabilized PVC containing recycled material which comprises a compound from the series consisting of the hydrotalcites or zeolites. The compounds from the series consisting of the hydrotalcites or zeolites can be either naturally occurring materials or synthetic compounds.

Compounds from the series consisting of the hydrotalcites can be described by the general formula III, $$M^{2+}_{1-x} \cdot M^{3+}_x \cdot (OH)_2 \cdot (A^{y-})_{x/y} \cdot pH_2O \qquad (III)$$

where $M^{2+}$=Mg, Ca, Sr, Zn, Sn and/or Ni, $M^{3+}$=Al, B or Bi, $A^{y-}$ is an anion having the valency y, y is a number from 1 to 4, x is a number from 0 to 0.5 and p is a number from 0 to 20, further examples are given in DE 4 106 403.

$A^{y-}$ is preferably $OH^-$, $Cl^-$, $Br^-$, $I^-$, $ClO_4^-$, $HCO_3^-$, $CH_3COO^-$, $C_6H_5COO^-$, $CO_3^{2-}$, $SO_4^{2-}$, $^-OOC-COO^-$), $(CHOHCOO)_2^{2-}$, $(CHOH)_4CH_2OHCOO^- \cdot C_2H_4(COO)_2^{2-}$, $(CH_2COO)_2^{2-}$, $CH_3CHOHCOO^-$, $SiO_3^{2-}$, $SiO_4^{4-}$, $Fe(CN)_6^{3-}$, $Fe(CN)_6^{4-}$ oder $HPO_4^{2-}$.

Other hydrotalcites which can preferably be used are compounds having the general formula IIIa, $$M^{2+}_x \cdot Al_2 \cdot (OH)_{2x+6yz} \cdot (A^{y-})_2 \cdot pH_2O \qquad (IIIa)$$

wherei $M^{2+}$ is at least one metal from the series consisting of Mg and Zn, preferably Mg, $A^{y-}$ is an anion, for example from the series consisting of $CO_3^{2-}$, $(^-OOC-COO^-)$, $OH^-$ and $S^{2-}$ where y is the valency of the anion, p is a positive number, preferably from 0.5 to 15, and x and z are positive numbers, x preferably being from 2 to 6 and z preferably being less than 2.

Preference is given to compounds from the series consisting of the hydrotalcites of the general formula III, $$M^{2+}_{1-x} \cdot M^{3+}_x \cdot (OH)_2 \cdot (A^{y-})_{x/y} \cdot pH_2O \qquad (III)$$

where $M^{2+}$ is mg or a solid solution of Mg and Zn, $A^{y-}$ is $CO_3^{2-}$, x is a number from 0 to 0.5 and p is a number from 0 to 20.

Very particular preference is given to hydrotalcites of the formulae $Al_2O_3 \cdot 6MgO \cdot CO_2 \cdot 12H_2O$, $Mg_{4.5}Al_2(OH)_{13} \cdot CO_3 \cdot 3,5H_2O$, $4MgO \cdot Al_2O_3 \cdot CO_2 \cdot 9H_2O$, $4MgO \cdot Al_2O_3 \cdot CO_2 \cdot 6H_2O$, $ZnO \cdot 3MgO \cdot Al_2O_3 \cdot CO_2 \cdot 8-9H_2O$ or $ZnO \cdot 3MgO \cdot Al_2O_3 \cdot CO_2 \cdot 5-6H_2O$.

The hydrotalcites can be used in an amount of, for example, from 0.1 to 20 parts by weight, preferably from 0.5 to 10 parts by weight, in particular from 0.5 to 5 parts by weight, based on 100 parts by weight of PVC.

Zeolites can be described by the general formula (IV)

$$M'_{q/s}[(AlO_2)_q(SiO_2)_r] \cdot wH_2O \qquad (IV)$$

where s is the charge of the cation M',

M' is an element from the first or second main group, or zinc, r:q is a number between 0.8 and infinity, preferably between 0.8 and 10.5 and w is a number between 0 and 300.

Furthemore, zeolites which can be used according to the invention are disclosed in "Atlas of Zeolite Structure Types", W. M. Meier and D. H. Olson, Butterworths, 2nd Edition, 1986.

Zeolites in the broader sense also include aluminium phosphates having a zeolite structure.

The preferred zeolites which are known per se have an average effective pore diameter of 3–5 Å and can be prepared by known methods. Particular preference is given to zeolites of type NaA which have an average effective pore diameter of 4 Å, and are therefore known as zeolites 4 Å.

Particular preference is given to crystalline sodium aluminosilicates whose particle size is at least predominantly in the range from 1–10µ.

Preference is given to stabilized PVC containing recycled material, as described above, containing at least one of the compounds of the formulae $Na_{12}Al_{12}Si_{12}O_{48} \cdot 27\ H_2O$ [zeolite A], $Na_6Al_6Si_6O_{24} \cdot 2\ NaX \cdot 7,5\ H_2O$, X=OH, halogen, $ClO_4$ [sodalite]

$Na_6Al_6Si_{30}O_{72} \cdot 24\ H_2O$, $Na_8Al_8Si_{40}O_{96} \cdot 24\ H_2O$, $Na_{16}Al_{16}Si_{24}O_{80} \cdot 16\ H_2O$, $Na_{16}Al_{16}Si_{32}O_{96} \cdot 16\ H_2O$, $Na_{56}Al_{56}Si_{136}O_{384} \cdot 250\ H_2O$, [zeolite Y]

$Na_{86}Al_{86}Si_{106}O_{384} \cdot 264\ H_2O$ [zeolite X]

or the zeolites which can be prepared by replacement of all or some of the sodium atoms by lithium, potassium, magnesium, calcium, strontium or zinc atoms, such as $(Na,K)_{10}Al_{10}Si_{22}O_{64} \cdot 20\ H_2O$.

$Ca_{4.5}Na_3[(AlO_2)_{12}(SiO_2)_{12}] \cdot 30\ H_2O$ $K_9Na_3[(AlO_2)_{12}(SiO_2)_{12}] \cdot 27\ H_2O$ The zeolites can be used in an amount of, for example, from 0.1 to 20 parts by weight, preferably from 0.5 to 10 parts by weight, in particular from 0.5 to 5 parts by weight, based on 100 parts by weight of PVC.

Preference is given to stabilized PVC containing recycled material, comprising (a) PVC containing at least 1% of recycled material, (b) at least one lubricant, in particular 0.1–10 parts per 100 parts of PVC, (c) at least one metal salt of a fatty acid, in particular 0.01–10.0 parts per 100 parts of PVC, and at least one terminal epoxide compound, in particular 0.1–30.0 parts per 100 parts of PVC.

Preference is furthermore given to stabilized PVC containing recycled material which additionally comprises a plasticizer, in particular 5–120 parts per 100 parts of PVC.

Preference is furthermore given to stabilized PVC containing recycled material which additionally comprises a 1,3-diketo compound, in particular 0.01–10 parts per 100 parts of PVC.

Preference is furthermore given to stabilized PVC containing recycled material which additionally comprises a polyol, in particular 0.01–20 parts per 100 parts of PVC.

Preference is furthermore given to stabilized PVC containing recycled material which additionally comprises a zeolite, in particular 0.1–20 parts per 100 parts of PVC.

Preference is furthermore given to stabilized PVC containing recycled material which additionally comprises a hydrotalcite, in particular 0.1–20 parts per 100 parts of PVC.

Preference is furthermore given to stabilized PVC containing recycled material which additionally comprises an organic phosphite, in particular 0.01–5 parts per 100 parts of PVC.

Particular preference is given to stabilized PVC containing recycled material which, in addition to PVC, lubricant, metal salt of a fatty acid and terminal epoxide compound , comprises a phenolic antioxidant and a hydrotalcite.

Particular preference is given to stabilized PVC containing recycled material which, in addition to PVC, lubricant, metal salt of a fatty acid and terminal epoxide compound, additionally comprises a phenolic antioxidant, a polyol, a 1,3-diketo compound and a zeolite.

In the preferred stabilized PVC containing recycled material, it is furthermore unimportant with which stabilizer system the used PVC was originally stabilized. Adverse effects, such as discoloration, arising from stabilization of used material by means of unsuitable systems, are avoided.

The present invention furthermore relates to a stabilizer mixture comprising a lubricant, a metal salt of a fatty acid and a terminal epoxide compound, with the proviso that no sterically hindered phenol is present. The abovementioned preferences apply to the Individual mixture constituents, and the stabilizer mixture can likewise comprise the further constituents described above.

The present invention furthermore relates to the use of a lubricant and a metal salt of a fatty acid in combination with a terminal epoxide compound for stabilizing PVC containing recycled material. The abovementioned preferences apply to the individual stabilizers and to the PVC itself, and in addition one of the further constituents described above can likewise be used.

The novel stabilized PVC can be prepared in a manner known per se, using equipment known per se, such as calenders, mixers, compounders, extruders and the like, to mix said stabilizers and, if desired, further additives with the PVC. The stabilizers can be added individually or as a mixture or alternatively in the form of masterbatches.

The stabilizers employed can be in powder form, but also In compacted or granulated form or on support materials.

The PVC stabilized In accordance with the present invention can be converted Into the desired shape by known methods. Such methods are, for example, grinding, calendering, extrusion, injection moulding, sintering or spinning, furthermore extrusion blow moulding or conversion by the plastisol process. Stabilized PVC can also be converted into foams.

The novel PVC Is particularly suitable for semirigid and flexible formulations, in particular In the form of flexible formulations for wire sheaths, cable Insulations or roof sheeting, which are particularly preferred. In the form of semirigid formulations, the novel PVC is particularly suitable for sheeting, decorative films, foams, agricultural sheeting, tubes, sealing profiles and office films.

Examples of the use of the novel PVC as a plastisol are artificial leather, floor coverings, textile coatings, wall coverings, coil coatings and automotive underseal.

Examples of sintered PVC applications of the PVC stabilized in accordance with the invention are slush, slush mould and coil coatings.

The examples below illustrate the invention in greater detail without representing a limitation. Parts and percentages are, as in the remainder of the description, by weight, unless stated otherwise.

EXAMPLES 1–4

A PVC composition is prepared by mixing the individual components as shown in Table 1 below (amounts in parts by weight). 50 g of the mixture are compounded for 10 minutes at 180° C. and 40 rpm in a Brabender mixing chamber. The polymer composition is removed from the mixing chamber and pre-pressed for one minute at 30° C. and 20 kN. A sheet with a thickness of 1 mm is produced from the pressing at 180° C. at 50 kN.

After comminution of the pressed sheet, the stability of the PVC is determined by the dehydrochlorination test ("DHC-Test"), carried out in accordance with DIN 53381, Part 3. In this test, the time taken for the dehydrochlorination curve to rise is measured at the temperature shown in each case.

TABLE 1

|  | Sample composition | HCl-evolution [min] | Induction time 200 µS [min] |
|---|---|---|---|
| Comparison 1 | 100% of fresh product | 150 | 287 |
| Comparison 2 | 95% of fresh product + 5% of used material (weathered outdoors) | 71 | 181 |
| Comparison 3 | 70% of fresh product + 30% of used material (weathered outdoors) | 10 | 39 |
|  | 70% of fresh material + 30% of used material (weathered outdoors) and |  |  |
| Example 1 | 1.5% of lubricant 1 + 2% of mixture 2 | 114 | 233 |
| Example 2 | 1.5% of lubricant 1 + 2.3% of mixture 1 + 1% of epoxy 1 | 112 | 299 |
| Example 3 | 1.0% of lubricant 2 + 4.6% of mixture 1 | 178 | 398 |
| Example 4 | 2.0% of lubricant 2 + 4.6% of mixture 1 | 175 | 405 |

EXAMPLES 5 AND 6

1050 g of fresh PVC roof sheeting, 450 g of used PVC roof sheeting which has been weathered outdoors and 22.5 g of partially oxidized polyethylene wax are premixed at a temperature of up to 100° C.

150 g of this polymer composition are homogenized for 10 minutes at 190° C. in a roll mill with the additives shown in Table 2, giving a film with a thickness of 0.3–0.5 mm.

After comminution of the rolled film, stability of the PVC is determined by the dehydrochlorination test ("DHC-Test") carried out in accordance with DIN 53381, Part 3. In this test, the time taken for the dehydrochlorination curve to rise is measured at the temperature shown in each case.

TABLE 2

| Sample composition | | Adhesion | HCl-evolution Induction time 200 μS [min] | [min] |
|---|---|---|---|---|
| Comparison 1 | 100% of fresh product | | 202 | 315 |
| Comparison 2 | 95% of fresh product + 5% of used material (weathered outdoors) | impossible to produce sheeted-out compound | | |
| Comparison 3 | 70% of fresh product + 30% of used material (weathered outdoors) | impossible to produce sheeted-out compound | | |
| | 70% of fresh product + 30% of used material (weathered outdoors) and | | | |
| Example 5 | 1.5% of lubricant 1 + 3.75% of mixture 1 | | 105 | 292 |
| Example 6 | 1.5% of lubricant 1 + 3.10% of mixture 2 | | 115 | 277 |

The following abbreviations are used in the Examples:

Lubricant 1: partially oxidized polyethylene wax

Lubricant 2: stearic acid

Epoxy 1: Araldit® GY 250

Mixture 1:
    32.7% of Araldit GY 250 (epoxy resin based on bisphenol A; Ciba; CH)
    8.3% of bisphenol A
    9.8% of zinc stearate
    49.2% of hydrotalcite (Alkamizer IV)

Mixture 2:
    62.4% of Araldit GY 282 (bisphenol F diglycidyl ether; Ciba; CH)
    1.3% of Mark 6045 J (9% of $NaClO_4$ on an inorganic support)
    6.3% of bisphenol A
    10.0% of zinc stearate
    6.3% of Malbit CR (maltitol)
    3.7% of 1,3-diketone of the formula

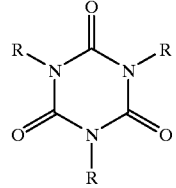

where
    R is a —$CH_2CH_2OC(O)CH_2C(O)CH_3$ radical,
7.5% Wessalith P
2.5% beta-Naphthol.

What is claimed is:

1. A stabilizer mixture consisting of a lubricant, a metal salt of a fatty acid and a terminal epoxide compound.

2. A stabilizer mixture consisting of a lubricant, an organozinc compound and a terminal epoxide compound.

* * * * *